US012312567B2

(12) United States Patent
Zerhusen

(10) Patent No.: US 12,312,567 B2
(45) Date of Patent: May 27, 2025

(54) PARTICULATE LAUNDRY SCENT ADDITIVE COMPRISING A POLYETHYLENE GLYCOL/ETHOXYLATED ALCOHOL POLYMER COMPOSITION

(71) Applicant: The Procter & Gamble Company, Cincinnati, OH (US)

(72) Inventor: Jaden Scott Zerhusen, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 106 days.

(21) Appl. No.: 17/970,802

(22) Filed: Oct. 21, 2022

(65) Prior Publication Data

US 2023/0054402 A1 Feb. 23, 2023

Related U.S. Application Data

(63) Continuation of application No. PCT/US2021/070424, filed on Apr. 20, 2021.

(30) Foreign Application Priority Data

Apr. 21, 2020 (EP) .................................... 20170543

(51) Int. Cl.

| | |
|---|---|
| ***C11D 1/72*** | (2006.01) |
| ***C11D 1/722*** | (2006.01) |
| ***C11D 3/04*** | (2006.01) |
| ***C11D 3/37*** | (2006.01) |
| ***C11D 3/50*** | (2006.01) |

(52) U.S. Cl.

CPC ................ *C11D 3/505* (2013.01); *C11D 1/72* (2013.01); *C11D 1/722* (2013.01); *C11D 3/046* (2013.01); *C11D 3/3707* (2013.01)

(58) Field of Classification Search

CPC .... C11D 1/72; C11D 3/37; C11D 3/43; C11D 3/50; C11D 3/502; C11D 3/505; C11D 7/10; C11D 9/44; C11D 17/0052; C11D 2111/14

See application file for complete search history.

(56) References Cited

U.S. PATENT DOCUMENTS

| | | | | |
|---|---|---|---|---|
| 5,670,473 | A | 9/1997 | Scepanski | |
| 5,858,957 | A * | 1/1999 | Donoghue ............. | C11D 17/06 510/351 |
| 7,867,968 | B1 | 1/2011 | Aouad | |
| 10,913,920 | B1 * | 2/2021 | van Buskirk .......... | C11D 3/046 |
| 2017/0226690 | A1 * | 8/2017 | Brain ....................... | B01J 13/06 |
| 2019/0119608 | A1 | 4/2019 | Schmiedel et al. | |
| 2020/0255769 | A1 | 8/2020 | Schmiedel et al. | |

FOREIGN PATENT DOCUMENTS

| | | | |
|---|---|---|---|
| CN | 103205328 | A | 7/2013 |
| DE | 102017218990 | A1 | 4/2019 |
| DE | 102017222992 | A1 | 6/2019 |
| EP | 3282003 | A1 | 2/2018 |
| WO | 2016081006 | A1 | 5/2016 |
| WO | 2018055107 | A1 | 3/2018 |

OTHER PUBLICATIONS

All Office Actions; U.S. Appl. No. 18/436,784, filed Feb. 8, 2024.
Unpublished U.S. Appl. No. 18/436,784, filed Feb. 8, 2024, to Jaden Scott Zerhusen.
13269 Extended EP Search Report and Written Opinion for 20170543.1 dated Oct. 9, 2020, 11 pages.
15771 PCT Search Report and Written Opinion for PCT/US2021/070424 dated Jul. 6, 2021, 17 pages.
W. Voigt and D. Zeng, "Solid-liquid equilibria in mixtures of molten salthydrates for the design of heat storage materials", Pure Appl. Chem., vol. 74, No. 10, 2002, pp. 1909-1920, XP002800477, Retrieved from the Internet: URL: https:// www.researchgate.net/publication/254839785 Solid-liquid_equilibria_in_mixturesofmolten_salt_hydrates_for_the_design_of_heat_storage_materials [retrieved on Sep. 23, 2020].

* cited by examiner

*Primary Examiner* — Charles I Boyer
(74) *Attorney, Agent, or Firm* — Carolyn S. Powell; George H. Leal; Gary J. Foose

(57) ABSTRACT

A composition including a plurality of particles, each of the particles including: about 40% to about 90% by weight of the particles water soluble polymer; about 1% to about 40% by weight of the particles of a salt hydrate; and about 0.1% to about 20% by weight of the particles perfume; wherein the perfume is dispersed in a matrix of the water soluble polymer and the salt hydrate. A process for forming particles that includes using an anhydrous salt to manage water.

19 Claims, 2 Drawing Sheets

PARTICULATE LAUNDRY SCENT ADDITIVE COMPRISING A POLYETHYLENE GLYCOL/ETHOXYLATED ALCOHOL POLYMER COMPOSITION

FIELD OF THE INVENTION

Fabric care laundry scent additives

BACKGROUND OF THE INVENTION

Consumers enjoy using particulate laundry scent additives that are delivered through the wash. In particular, consumers like laundry scent additives that are packaged in a manner that enables the consumer to use a custom amount of the laundry scent additive based on the consumer's judgment of how much of the laundry scent additive is needed to provide the desired benefit. Such laundry scent additives are conveniently provided through the wash along with a fully formulated fabric care composition.

A typical particulate laundry scent additive consists of a carrier and perfume. The particles dissolve or disperse in the wash to release the perfume and perfume is deposited on the articles that are being laundered. A common process for manufacturing such particulate laundry scent additives includes using water to carry the perfume as a perfume in water emulsion or water in perfume emulsion or using water to carry encapsulated perfume to a melt of the carrier material and mixing the two together and then fabricating particles from the mixture.

An abundance of water in particulate laundry scent additives is problematic because the water tends to weaken the structure integrity of the particle. This can result in there being an upper limit on the weight fraction of perfume that can provided in a particulate laundry scent additive. With this limitation in mind, there is a continuing unaddressed need for particulate laundry scent additives that can carry high levels of perfume.

SUMMARY OF THE INVENTION

A composition comprising a plurality of particles, each of the particles comprising: about 40% to about 90% by weight of the particles water soluble polymer; about 1% to about 40% by weight of the particles of a salt hydrate; and about 0.1% to about 20% by weight of the particles perfume; wherein the perfume is dispersed in a matrix of the water soluble polymer and the salt hydrate.

A process for forming particles comprising the steps of: providing a melt composition comprising: about 40% to about 90% by weight water soluble polymer; about 1% to about 20% by weight perfume; and about 1% to about 40% by weight water; mixing anhydrous salt with the melt composition or a component thereof and hydrating the anhydrous salt to form a salt hydrate, wherein the salt hydrate has a salt hydrate onset of melt; providing a distributor having one or more apertures; passing a mixture comprising the water soluble polymer, the perfume, and the salt hydrate through the one or more apertures and depositing the mixture on a moving conveyor beneath the one or more apertures, wherein the mixture has a temperature less than the salt hydrate onset of melt; and solidifying the mixture; wherein the mixture is deposited on the moving conveyor as an extrudate and the extrudate is cut to form the particles or the mixture is passed though the one or more apertures to form droplets on the moving conveyor and the droplets are solidified to form the particles.

DETAILED DESCRIPTION OF THE INVENTION

Figure 1:
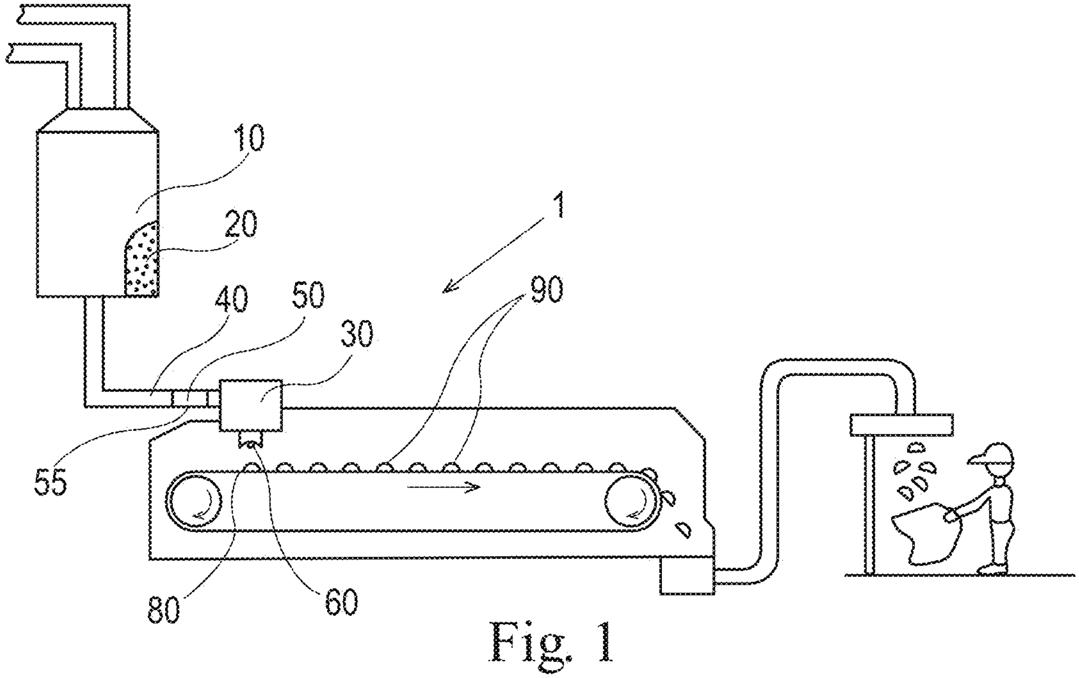
FIG. 1. An apparatus for forming particles.

One of the challenges associated with providing high levels of perfume in particulate laundry scent additives is managing water that is used to manufacture the particles. Particles can be produced by forming a melt of a water soluble polymer and mixing the melted water soluble polymer and perfume together. This mixture can be extruded from a die to produce a noodle that is cut into small particles. Optionally the mixture can be fed through a rotoformer or other device having apertures to deposit drops of the mixture onto a belt and the drops subsequently cool or otherwise solidify to form particles.

Water is commonly used to carry perfume in melt processing apparatuses. The perfume may be unencapsulated perfume that is transported as a perfume in water or water in a perfume emulsion. The perfume may be encapsulated perfume.

To simplify manufacturing processes, a slurry of encapsulated perfume and water can be provided. Optionally, a slurry of perfume delivery systems may be provided as a slurry of perfume delivery system and water. Slurries can be readily handled in product manufacturing processes and the rheological properties of the slurry can be at least partially controlled by the amount of water in the slurry. For a slurry comprising encapsulated perfume, the slurry can comprise encapsulated perfume and water. The slurry can comprise from about 10% to about 50% by weight perfume, about 5% to about 20% by weight encapsulate shell, and about 40% to about 80% by weight water. The slurry can optionally comprise from about 20% to about 40% by weight perfume. The slurry can optionally comprise about 5% to about 15% by weight encapsulate shell. The slurry can optionally comprise from about 50% to about 70% by weight water. The slurry can comprise additional minor materials including, but not limited to, antimicrobial material, antioxidant, stabilizers, rheology modifiers, and stabilizing salts.

In melt processing in which water soluble polymers form a significant fraction of the melt, high quantities of water may not be desirable. An excess of water can result in lengthy drying times for the melt or require using heat to dry the particles, which can make the manufacturing process more expensive than desirable. Further, an excess of water in the melt can weaken the structure of the finished particle. This can occur since water that remains in the structure has little strength per se. If the water is removed by drying, empty voids may be left behind and the voids may weaken the structure of the particle.

To help manage the water in a melt of water soluble polymer, it can be practical to provide an anhydrous salt to the melt. Anhydrous salts have a propensity to hydrate with water from the surrounding environment. The anhydrous salt can be selected based on the melt processing conditions. For melt processing particulate laundry scent additives, the perfume portion of the laundry scent additive can influence the selection of the anhydrous salt.

The temperature of the melt is an important variable to control when manufacturing particulate laundry scent additives. The temperature of the melt ideally does not exceed the flash point or boiling point of the perfume employed. Otherwise, some or all of the perfume will flash or boil off and may not end up in the particulate laundry scent additive. The flash point of perfumes typically used in laundry scent additives may be about 70 C.

The onset of melt of the melt is also an important factor to consider when selecting the water soluble polymer employed. The water soluble polymer should have a water soluble polymer onset of melt that is high enough so that the particles formed are stable at temperatures that the particles will experience in the supply chain of transporting the particles from the manufacturer to the consumer.

The constraints of flash point or boiling point of the perfume and the water soluble polymer onset of melt may provide for boundaries on the choices for the water soluble polymer used for making particulate laundry sent additives using melt processes.

There are a variety of anhydrous salts that hydrate into a salt hydrate and the resulting salt hydrate has a salt hydrate onset of melt above the water soluble polymer onset of melt that is useful in particulate laundry scent additives. Of these salt hydrates there are some that have a salt hydrate onset of melt that is also below the flash point and boiling point of the perfume. By using a salt hydrate that has a salt hydrate onset of melt that is between the water soluble polymer onset of melt and the flash point or boiling point of the perfume, there is a temperature range within which the melt of water soluble polymer, perfume, and salt hydrate are melt processable. Further, the salt hydrate can be provided to the melt by introducing an anhydrous salt of the salt hydrate. The anhydrous salt can acquire water in the melt when the anhydrous salt hydrates into a salt hydrate. Moreover, the since hydration occurs above the water soluble polymer onset of melt, the composition remains melt processable since the water soluble polymer dominates the rheological properties of the melt. If the salt hydrate onset of melt is below the water soluble polymer onset of melt, once the temperature of the particle reaches a temperature of the salt hydrate onset of melt, the salt hydrate will release its water and the water may dissolve at least some of the water soluble polymer, which results in an unstable particle.

The amount of anhydrous salt added to a melt that includes water can be computed based on the amount of water in the melt to be managed. The water is managed by the anhydrous salt hydrating into its salt hydrate, thereby acquiring the water being managed. For example, sodium acetate anhydrous, upon exposure to water, can hydrate into sodium acetate trihydrate. This means that 1 mol of sodium acetate anhydrous can combine with 3 mol of water. With knowledge of the amount of water in the melt to be managed, the amount of anhydrous salt added, which ultimately ends up as a salt hydrate, can be determined.

Water Soluble Polymer

The particles can comprise a water soluble polymer. The water soluble polymer can function as a carrier for perfume. In the wash, the water soluble polymer can disperse into the wash liquor and release the perfume into the wash liquor, the perfume subsequently being deposited on the articles being washed.

The water soluble polymer can be selected from the group consisting of C8-C22 alkyl polyalkoxylate comprising more than about 40 alkoxylate units, ethoxylated nonionic surfactant having a degree of ethoxylation greater than about 30, polyalkylene glycol having a weight average molecular weight from about 2000 to about 15000, and combinations thereof.

The water soluble polymer can be a block copolymer having Formulae (I), (II), (III) or (IV), $$R^1O\text{-}(EO)x\text{—}(PO)y\text{—}R^2 \quad (I),$$

$$R^1O\text{—}(PO)x\text{-}(EO)y\text{-}(EO)y\text{—}R^2 \quad (II),$$

$$R^1O\text{-}(EO)o\text{—}(PO)p\text{-}(EO)q\text{—}R^2 \quad (III),$$

$$R^1O\text{—}(PO)o\text{-}(EO)p\text{—}(PO)q\text{—}R^2 \quad (IV),$$

or a combination thereof;

wherein EO is a $—CH_2CH_2O—$ group, and PO is a $—CH(CH_3)CH_2O—$ group;

$R^1$ and $R^2$ independently is H or a C1-C22 alkyl group;

x, y, o, p, and q independently is 1-100;

provided that the sum of x and y is greater than 35, and the sum of o, p and q is greater than 35;

wherein the block copolymer has a molecular weight ranging from about 3000 g/mol to about 15,000 g/mol.

The water soluble polymer can be a block copolymer or block copolymers, for example a block copolymer based on ethylene oxide and propylene oxide selected from the group consisting of PLURONIC-F38, PLURONIC-F68, PLURONIC-F77, PLURONIC-F87, PLURONIC-F88, and combinations thereof. PLURONIC materials are available from BASE The water soluble polymer can be selected from the group consisting of polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from the group consisting of PVA; PVA copolymers; hydroxypropyl methyl cellulose (HPMC); and mixtures thereof.

The water soluble polymer can be selected from the group consisting of polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble polymer can be an organic material. Organic water soluble polymers may provide a benefit of being readily soluble in water.

The water soluble polymer can be selected from the group consisting of polyethylene glycol, polypropylene glycol polyoxoalkylene, polyethylene glycol fatty acid ester, polyethylene glycol ether, starch, and mixtures thereof.

The water soluble polymer can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 25% to about 94% by weight PEG having a weight average molecular weight from about 2000 to about 15000. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, alternatively from about 4,000 to about 13,000, alternatively from about 4,000 to about 12,000, alternatively from about 4,000 to about 11,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000 (which has a weight average molecular weight of 9000 even though 8000 is in the product name), or other PLURIOL product. The water soluble polymer can be a mixture of two or more polyethylene glycol compositions, one having a first weight average molecular weight (e.g. 9000) and the other having a second weight average molecular weight (e.g. 4000), the second weight average molecular weight differing from the first weight average molecular weight.

The individual particles can comprise about 40% to about 90% by weight of the individual particles of PEG. Optionally, the individual particles can comprise from about 35% to about 95%, optionally from about 50% to about 80%, optionally combinations thereof and any whole percentages or ranges of whole percentages within any of the aforementioned ranges, of PEG by weight of the respective individual particles.

The water soluble polymer can comprise a material selected from the group consisting of: a polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; a polyethylene glycol fatty alcohol ether of formula $HO—(C_2H_4O)_s—(CH_2)_t)—CH_3$ wherein s is from about 30 to about 250 and t is from about 10 to about 30; and mixtures thereof. The polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200, can be a block copolymer or random copolymer.

The water soluble polymer can comprise: polyethylene glycol; a polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; and a polyethylene glycol fatty alcohol ether of formula $HO—(C_2H_4O)_s—(CH_2)_t)—CH_3$ wherein s is from about 30 to about 250 and t is from about 10 to about 30.

The water soluble polymer can comprise from about 20% to about 80% by weight of the particles of polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200.

The water soluble polymer can comprise from about 1% to about 20% by weight of the particles polyethylene glycol fatty acid ester of formula $(C_2H_4O)_q—C(O)O—(CH_2)_r—CH_3$ wherein q is from about 20 to about 200 and r is from about 10 to about 30.

The water soluble polymer can comprise from about 1% to about 10% by weight of the particles of polyethylene glycol fatty alcohol ether of formula $HO—(C_2H_4O)_s—(CH_2)_t)—CH_3$ wherein s is from about 30 to about 250 and t is from about 10 to about 30.

Each of the particles can comprise from about 40% to about 90% by weight water soluble polymer. Optionally each of the particles can comprise from about 45% to about 85%, or even from about 50% to about 80%, by weight water soluble polymer.

The water soluble polymer can have a water soluble polymer onset of melt less than 58 C. Such a water soluble polymer can be practical if the salt hydrate has a salt hydrate onset of melt greater than 58 C. By having the water soluble polymer onset of melt less than the salt hydrate onset of melt, a melt of the water soluble polymer that includes the salt hydrate can be processed within the range of temperatures between the water soluble polymer onset of melt and the salt hydrate onset of melt without the salt hydrate releasing the bound water.

Perfume

A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from the group consisting of ethanol, isopropanol, diethylene glycol monoethyl ether, dipropylene glycol, diethyl phthalate, triethyl citrate, and mixtures thereof.

The perfume can be provided as unencapsulated perfume. The perfume can be provided in a perfume delivery system. Zeolite and cyclodextrine are examples of perfume delivery systems. The perfume can be encapsulated in starch. For example an emulsion of starch and perfume oil can be spray dried to form particles of starch having droplets of perfume dispersed within the starch matrix. Perfume delivery systems can be particulate materials or fine particulate materials that may be difficult to handle in a manufacturing environment due to the possibility that the particles may become suspended in air.

The perfume can be encapsulated perfume. Encapsulated perfume is commonly employed in laundry products. Encapsulated perfume comprises a plurality of droplets of liquid perfume each of which are encapsulated in an encapsulate shell. Perfume may be encapsulated in a water soluble or water insoluble encapsulate shell. Encapsulate shell can comprise melamine-urea-formaldehyde, melamine formaldehyde, urea formaldehyde, starch, and the like materials. The encapsulate shell wall can be a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the encapsulate shell comprises an aminoplast, the aminoplast may comprise polyurea, polyurethane, and/or polyureaurethane. The polyurea may comprise polyoxymethyleneurea and/or melamine formaldehyde. Encapsulates having an encapsulate shell comprising a polysaccharide can be practical. The encapsulate shell can be selected from the group consisting of chitosan, gum arabic, alginate, β-glucan, starch, starch derivatives, plant proteins, gelatin, alyssum homolocarpum seed gum, and combinations thereof. The perfume can comprise one or more fragrances of plant origin. A fragrance of plant origin is a concentrated hydrophobic liquid containing volatile chemical compound extracted from a plant. The fragrance of plant origin can be selected from the group consisting of allspice berry, angelica seed, anise seed, basil, bay laurel, bay, bergamot, blood orange, camphor, caraway seed, cardamom seed, carrot seed, cassia, catnip, cedarwood, celery seed, chamomile german, chamomile roman, cinnamon bark, cinnamon leaf, citronella, clary sage, clove bud, coriander seed, cypress, elemi, eucalyptus, fennel, fir needle, frankincense, geranium, ginger, grapefruit pink, helichrysum, hop, hyssop, juniper berry, labdanum, lavender, lemon, lemongrass, lime, magnolia, mandarin, marjoram, melissa, mugwort, myrrh, myrtle, neroli, niaouli, nutmeg, orange sweet, oregano, palmarosa, patchouli, pennyroyal, pepper black, peppermint, petitgrain, pine needle, radiata, ravensara, rose, rosemary, rosewood, sage, sandalwood, spearmint, spikenard, spruce, star anise, sweet annie, tangerine, tea tree, thyme red, verbena, vetiver, wintergreen, wormwood, yarrow, ylang ylang extra, and ylang ylang III, and mixtures thereof.

The particles can comprise from about 0.1% to about 20% by weight of the particles perfume, optionally from about 0.1% to about 15%, optionally from about 0.1% to about 12%, optionally from about 1% to about 15%, optionally from about 2% to about 20%, optionally from about 8% to about 10% by weight of the particles perfume.

Salt Hydrate

Each of the particles can comprise a salt hydrate. The salt hydrate can be formed by anhydrous salt being introduced into a melt comprising the water soluble polymer, perfume, and water.

The salt hydrate can have an onset of melt greater than 40 C. Salt hydrates having such an onset of melt can be practical since 40 C is a temperature representative of the temperatures that finished particles might be exposed to during shipping and storage. The salt hydrate will tend to melt at a temperature greater than its onset of melt, which can result in instability of the particles.

The salt hydrate can be selected from the group consisting of: calcium chloride tetrahydrate, calcium nitrate tetrahydrate, zinc nitrate trihydrate, zinc nitrate dihydrate, potassium fluoride dihydrate, iron nitrate nonahydrate, sodium dihydrogen phosphate heptahydrate, sodium dihydrogen phosphate dihydrate, sodium acetate trihydrate, sodium aluminum sulfate dodecahydrate, aluminum nitrate nonahydrate, lithium acetate dihydrate, sodium phosphate dodecahydrate, sodium thiosulfate pentahydrate, tetrasodium pyrophosphate decahydrate, barium hydroxide octahydrate, aluminum sulfate octadecahydrate, magnesium carbonate trihydrate, magnesium nitrate hexahydrate, magnesium nitrate dihydrate, magnesium sulfate heptahydrate, magnesium chloride hexahydrate, and combinations thereof.

The salt hydrate can be sodium acetate trihydrate. Sodium acetate trihydrate can have an onset of melt of about 58 C.

Each of the particles can comprise from about 1% to about 40% by weight salt hydrate. Optionally each of the particles can comprise from about 1% to about 30%, or even from about 1% to about 20%, or even from about 1% to about 10%, by weight salt hydrate.

The particles can further comprise acid. The acid can lower the pH of the particle, which may help to prevent discoloration of the particle. For example, sodium acetate trihydrate can tend to raise the pH of the particle and acid can be used to lower the pH. The particles can comprise from about 0.5% to about 5% by weight acid. The acid can be selected from the group consisting of citric acid, formic acid, and mixtures thereof.

Particles

Each of the particles can comprise: about 40% to about 90% by weight of the particles water soluble polymer; about 1% to about 40% by weight of the particles of a salt hydrate; and about 0.1% to about 20% by weight perfume; wherein the perfume is dispersed in a matrix of the water soluble polymer and the salt hydrate.

The perfume can be randomly dispersed or substantially randomly dispersed in the matrix of water soluble polymer and the salt hydrate. By substantially randomly dispersed it is meant that the perfume is distributed throughout the matrix with variability in distribution of the perfume being within the variability of the mixing process used when a melt of the water soluble polymer, anhydrous salt, and perfume is mixed.

The particles can each have a mass from about 1 mg to about 500 mg, alternatively from about 5 mg to about 500 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. An individual particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles are thought to provide for better packing of the particles in a container and faster dissolution in the wash. The composition can comprise less than 10% by weight of particles having an individual mass less than about 10 mg. This can reduce the potential for dust.

The particles disclosed herein, in any of the embodiments or combination disclosed, can have a shape selected from the group consisting of a sphere, hemisphere, oblate sphere, cylindrical, polyhedral, and oblate hemisphere. The particles may be hemispherical, compressed hemispherical, or have at least one substantially flat or flat surface. Such particles may have relatively high surface area to mass as compared to spherical particles. Dissolution time in water may decrease as a function of increasing surface area, with shorter dissolution time being preferred over longer dissolution time.

The particles disclosed herein can have ratio of maximum dimension to minimum dimension from about 10 to 1, optionally from about 8 to 1, optionally about 5 to 1, optionally about 3 to 1, optionally about 2 to 1. The particles disclosed herein can be shaped such that the particles are not flakes. Particles having a ratio of maximum dimension to minimum dimension greater than about 10 or that are flakes can tend to be fragile such the particles are prone to becoming dusty. The fragility of the particles tends to decrease with decreasing values of the ratio of maximum dimension to minimum dimension.

The particles can comprise less than about 10% by weight water. The weight percent of water and ratios of constituent materials to water with respect to the particles, melt composition, or mixture comprising the water soluble polymer, the encapsulated perfume, and the sodium acetate trihydrate does not include the water that forms part of the salt hydrate since that water is bound to and is a constituent part of the salt hydrate.

The particles can have a particles onset of melt from about 40 C to about 55 C. Such particles may be stable within the supply chain from manufacturer to the consumer's household.

Process for Forming Particles

The particles can be made by a process comprising multiple steps. A melt composition comprising about 40% to about 90% by weight water soluble polymer, about 1% to about 20% by weight perfume, and about 1% to about 40% by weight water can be provided. An anhydrous salt, by way of nonlimiting example sodium acetate anhydrous, can be mixed with the melt composition or a component thereof. The salt hydrate is thereby hydrated to form a salt hydrate, the salt hydrate having a salt hydrate onset of melt. If the anhydrous salt is sodium acetate anhydrous, the sodium acetate anhydrous can be mixed at a weight ratio of the sodium acetate anhydrous to the water from about 1:2 to 2:1, optionally from about 0.6:3 to about 1.5:3, and the sodium acetate anhydrous can be hydrated to form sodium acetate trihydrate. The anhydrous salt can be those listed previously and combinations thereof.

The melt composition can be prepared in a batch mixer or continuous mixer or made on a bench top by hand mixing the component materials. The water soluble polymer can be heated to a temperature that is above the water soluble polymer onset of melt and below the flash point or boiling point of the perfume. The perfume and accompanying water can be added to the melted water soluble polymer or vice versa to form a melt composition. The anhydrous salt can be added to the melt composition or a component of the melt composition.

A mixture comprising the water soluble polymer, perfume, and salt hydrate, at a temperature less than the salt hydrate onset of melt can be passed through one or more apertures and deposited on a moving conveyor as an extrudate or as droplets. At such a temperature, the salt hydrate can retain water within its structure. The mixture comprising the water soluble polymer, perfume, and salt hydrate can comprise less than about 15% by weight free water, optionally less than about 10% by weight free water, optionally less than about 5% by weight free water. Free water is water that is not bound to the salt hydrate.

The mixture can optionally be deposited into depressions of a mold and cooled or allowed to cool so that the mixture solidifies into the particles. The particles can be removed from the depressions of the mold to yield the finished product.

Optionally, the particles can be formed by passing a mixture comprising the water soluble polymer, perfume, and salt hydrate through one or more apertures of a distributor and depositing the mixture on a moving conveyor beneath the one or more apertures. The mixture can have a temperature less than the salt hydrate onset of melt when it is passed through the apertures. The mixture may be solidified to form the particles. The mixture may be deposited on the moving conveyor as an extrudate and the extrudate can be cut to form the particles. Or the mixture can be passed through the one or more apertures to form droplets on the moving conveyor and the droplets can be solidified to form the particles.

The perfume and water of the melt composition can be provided as a slurry comprising the perfume and water. Water based slurries can be convenient for delivering perfume, including encapsulated perfume. The perfume can be encapsulated perfume.

The anhydrous salt can be mixed with the melt composition or a component thereof in a stoichiometrically sufficient amount such that the mixture of the water soluble polymer, the perfume, and the salt hydrate has less than about 5% by weight water, that water being free water that is unbound to the salt hydrate.

Optionally, an acid can be added to the melt composition or a component thereof to lower the pH of the formed particles.

An apparatus 1 for forming particles is shown in FIG. 1. The melt composition 20 or mixture comprising the water soluble polymer, encapsulated perfume, and salt hydrate can be transported to a distributor 30. The distributor 30 can have a plurality of apertures 60. The melt composition 20 or mixture can be passed through the apertures 60 to form droplets 85 on a moving conveyor 80. And the particles 90 can solidify on the conveyor 80. The conveyor 80 can be actively cooled or the particles 90 may solidify by ambient cooling. The particles can be formed using a rotoforming apparatus to deposit droplets of the mixture on a moving conveyor. Optionally, the particles can be formed by extruding an extrudate of the mixture onto a moving conveyor and cutting the extrudate. The melt composition 20 can be provided in a mixer 10, for example a batch mixer or continuous mixer. The melt composition 20 can be transported to the distributor 30 via a feed pipe 40. Optionally, a mixer 50, such as a static mixer 55, can be provided in line with the feed pipe 40. Optionally the feed pipe 40 may be insulated or provided with a heated jacket.

Onset of Melt Test Method

Onset of melt is determined using the Onset of Melt Test Method as follows. Differential Scanning calorimetry (DSC) is used to quantify the temperature at which the onset of melt occurs for the peak melt transition of any given composition of particles or salt hydrate. The melt temperature measurements are made using a high quality DSC instrument with accompanying software and nitrogen purge capability, such as TA Instruments' model Discovery DSC (TA Instruments Inc./Waters Corporation, New Castle, Delaware, U.S.A.). A calibration check is conducted using an Indium standard sample. The DSC instrument is considered suitable to conduct the test if the onset of melt temperature measured for the Indium standard sample is within the range of 156.3-157.3° C.

A uniform test sample is prepared by obtaining at least 5 g of the composition, which is pulverised via milling into powder form using an analytical milling device, such as the IKA basic analytical mill model A11 B S1 (IKA-Werke GmbH & Co. KG, Staufen im Breisgau, Germany). The milled sample is subsequently sieved through a clean stainless steel sieve with sieve mesh size openings of nominally 1 mm in diameter (e.g. number 18 mesh size). For each sample to be tested, at least two replicate samples are independently milled and measured. A sample of the milled composition weighing approximately 5 mg is placed into the bottom of a hermetic aluminium DSC sample pan, and the sample is spread out to cover the base of the pan. A hermetic aluminium lid is placed on the sample pan, and the lid is sealed with a sample encapsulating press to prevent evaporation or weight loss during the measurement process. The DSC measurements are conducted relative to a reference standard. An empty aluminum DSC sample pan used as the reference standard, in order to measure the delta in heat adsorption of the sample-containing pan versus the empty reference pan.

The DSC instrument is set up to analyze samples using the following cycle configuration selections: Sample Purge Gas is nitrogen set at 50 mL/min; Sampling Interval is set at 0.1 s/point; Equilibrate is set at −20.00° C.; Isothermal Hold is set at 1 min. Data is collected during a single heating cycle using the settings: Ramp is set at 10.00° C./min to 90.00° C.; and Isothermal Hold is set at 90.00° C. for 1 min. A sealed sample pan containing a replicate test sample is carefully loaded into the instrument, as is an empty reference pan. The DSC analysis cycle specified above is conducted and the output data is assessed. The data acquired during the DSC heating cycle is typically plotted with Temperature on the X-axis (in ° C.) and Heat Flow normalized to sample weight (in W/g) on the Y-axis, such that melting points appear as downward (endothermic) peaks since they absorb energy.

A melt transition onset temperature is the temperature at which a deflection is first observed from the baseline previously established for the melt temperature of interest. The Peak Melt temperature is the specific temperature that requires the largest observed differential energy to transition the sample from a solid phase to a melt phase, during the specified DSC heating cycle. For the purpose of this invention, the Onset of Melt temperature is defined as the melt transition onset temperature for the Peak Melt temperature. Additional general information on the DSC technique may be found in the industry standard method ASTM D3418-03-Transition Temperatures of Polymers by DSC.

Using the DSC instrument software, two points are manually defined as the “Start and Stop Integration” baseline limits. The two points selected are on flat regions of the baseline to the left and right sides, respectively, of the melt transition peak detected. This defined area is then used to determine the peak temperature (T) which can be used to report the Peak Melt Temperature. The Onset of Melt temperature for the Peak Melt temperature is then identified by the instrument software.

The Onset of Melt temperature reported is the average result (in ° C.) from the replicate samples of the composition.

Formulations

Nonlimiting examples of some formulations of the melts from which particles can be made are listed in Table 1. PEG4000 and PEG8000 available from Dow Chemical Company.

TABLE 1

Example formulations of melt compositions.

| Component | Example | | | | |
|---|---|---|---|---|---|
| Material | A | B | C | D | E |
| PEG4000 | — | — | 85.73 | 84.13 | 82.13 |
| PEG8000 | 62.5 | 81.8 | — | — | — |
| Encapsulate Slurry (70% by weight water) | 10 | 3.87 | 3.87 | 3.87 | 3.87 |
| Unencapsulated Perfume | 7.5 | 10.33 | 10 | 10 | 10 |
| Sodium Acetate Anhydrous | 20 | 4 | 0.4 | 2 | 4 |

Examples

A series of specimens of particles were made to evaluate the stability of fabric care compositions described herein. The particles were made by hand as described previously.

Particles were tested for stability by storing in an open container in a constant temperature of 50 C and a constant relative humidity of 80% for about 1 week. The unencapsulated perfume is the perfume used DOWNY UNSTOPABLES, FRESH, variant as of the filing date. The encapsulated perfume is the encapsulated perfume used in DOWNY UNSTOPABLES, FRESH, variant as of the filing date. The encapsulate slurry is about 69% by weight water. PEG4000 and PEG8000 are available from Dow Chemical Company.

TABLE 2

Compositions, made into particles by hand, comprising water soluble polymer, encapsulated perfume (including water), unencapsulated perfume, and anhydrous salt. PEG4000 and PEG8000 available from Dow Chemical Company.

| Component | Specimen | | | | | | | | | | |
|---|---|---|---|---|---|---|---|---|---|---|---|
| Material | 1 | 2 | 3 | 4 | 5 | 6 | 7 | 8 | 9 | 10 | 11 |
| PEG4000 | 80 | 79 | 75 | 70 | — | — | — | — | — | — | — |
| PEG8000 | — | — | — | — | 80 | 75 | 70 | 65 | 75 | 70 | 65 |
| Encapsulate Slurry | 10 | 10 | 10 | 10 | 10 | 10 | 10 | 10 | 10 | 10 | 10 |
| Unencapsulated Perfume | 10 | 10 | 10 | 10 | 10 | 10 | 10 | 10 | 10 | 10 | 10 |
| Sodium Acetate Anhydrous | — | 1 | 5 | 10 | — | 5 | 10 | 15 | — | — | — |
| Sodium Sulfate Anhydrous | — | — | — | — | — | — | — | — | 5 | 10 | 15 |

Figure 2:
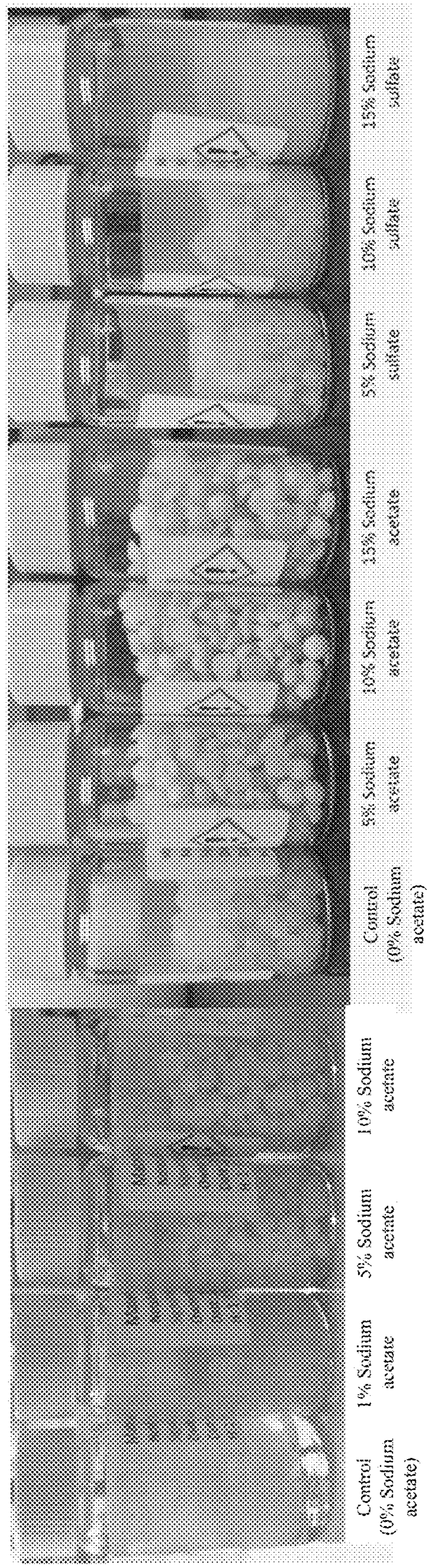
FIG. 2. Images of Specimens 1 to 11 in left to right order.

Images of Specimens 1 to 11, after about 1 week in storage, are shown in FIG. 2 in left to right order. Specimens 1 to 4 were made using PEG4000. As shown in FIG. 1, Specimen 1 did not retain a particulate form. Specimen 2, which was made with 1% by weight sodium acetate anhydrous, retained particulate form to some degree, although the particles were clumped together. Specimens 3 and 4, which were made with 5% and 10% by weight sodium acetate anhydrous, respectively, retained a particulate form. Specimens 5 to 11 were made using PEG8000. Specimen 5 retained particulate form but there was some clumping of particles. Specimens 6 to 8 included sodium acetate anhydrous and those specimens retained their particulate form without clumping. Specimens 9 to 11 included sodium sulfate anhydrous. The particles of Specimens 9 and 10, which included 5% and 10% by weight sodium sulfate anhydrous, respectively, retained particulate form but some clumping was observed. The observed clumping was higher for Specimen 10 than for Specimen 9. The particles of Specimen 11 did not retain their particulate form.

Combinations

An example is below:

A. A composition comprising a plurality of particles (90), each of said particles comprising:
  about 40% to about 90% by weight of said particles water soluble polymer;
  about 1% to about 40% by weight of said particles of a salt hydrate; and
  about 0.1% to about 20% by weight of said particles perfume;
  wherein said perfume is dispersed in a matrix of said water soluble polymer and said salt hydrate.

B. The composition according to Paragraph A, wherein said perfume is encapsulated perfume.

C. The composition according to Paragraph A or B, wherein said salt hydrate is selected from the group consisting of calcium chloride tetrahydrate, calcium nitrate tetrahydrate, zinc nitrate trihydrate, zinc nitrate dihydrate, potassium fluoride dihydrate, iron nitrate nonahydrate, sodium dihydrogen phosphate heptahydrate, sodium dihydrogen phosphate dihydrate, sodium acetate trihydrate, sodium aluminum sulfate dodecahydrate, aluminum nitrate nonahydrate, lithium acetate dihydrate, sodium phosphate dodecahydrate, sodium thiosulfate pentahydrate, tetrasodium pyrophosphate decahydrate, barium hydroxide octahydrate, aluminum sulfate octadecahydrate, magnesium carbonate trihydrate, magnesium nitrate hexahydrate, magnesium nitrate dihydrate, magnesium sulfate heptahydrate, magnesium chloride hexahydrate, and combinations thereof.

D. The composition according to any of Paragraphs A to C, wherein said water soluble polymer is selected from the group consisting of:
  a polyalkylene polymer of formula $H—(C_2H_4O)_x—(CH(CH_3)CH_2O)_y—(C_2H_4O)_z—OH$ wherein x is from 50 to 300, y is from 20 to 100, and z is from 10 to 200;
  a polyethylene glycol fatty acid ester of formula $(C_2H_4O)_q—C(O)O—(CH_2)_r—CH_3$ wherein q is from 20 to 200 and r is from 10 to 30;
  a polyethylene glycol fatty alcohol ether of formula $HO—(C_2H_4O)_s—(CH_2)_t)—CH_3$ wherein s is from 30 to 250 and t is from 10 to 30;
  C8-C22 alkyl polyalkoxylate comprising more than 40 alkoxylate units;
  polyethylene glycol having a weight average molecular weight from about 2000 to about 15000;
  EO/PO/EO block copolymer;
  PO/EO/PO block copolymer;
  EO/PO block copolymer;
  PO/EO block copolymer;
  polypropylene glycol;
  ethoxylated nonionic surfactant having a degree of ethoxylation greater than 30;
  polyvinyl alcohol;
  polyalkylene glycol having a weight average molecular weight from about 2000 to about 15000; and mixtures thereof.

E. The composition according to any of Paragraphs A to C, wherein said water soluble polymer is polyethylene glycol having a weight average molecular weight from about 2000 to about 15000.

F. The composition according to any of Paragraphs A to E, wherein said particles further comprise from about 0.5% to about 5% by weight acid.

G. The composition according to any of Paragraphs A to F, wherein said particles comprise less than about 10% by weight free water.

H. The composition according to any of Paragraphs A to G, wherein said particles have a particles onset of melt from about 40 C to about 55 C.

I. The composition according to any of Paragraphs A to H, wherein said salt hydrate has a salt hydrate onset of melt greater than about 40 C.

J. The composition according to any of Paragraphs A to I, wherein said perfume is unencapsulated perfume.

K. The composition according to any of Paragraphs A to J, wherein said salt hydrate sodium acetate trihydrate.

L. A process for forming the particles of any of Paragraphs A to K comprising the steps of:
  providing a melt composition (20) comprising:
  said water soluble polymer;
  said perfume; and
  said water;
  mixing anhydrous salt with said melt composition or a component thereof and hydrating said anhydrous salt to form said salt hydrate, wherein said salt hydrate has a salt hydrate onset of melt;
  providing a distributor (30) having one or more apertures (60);
  passing a mixture comprising said water soluble polymer, said perfume, and said salt hydrate through said one or more apertures and depositing said mixture on a moving conveyor (80) beneath said one or more apertures, wherein said mixture has a temperature less than said salt hydrate onset of melt; and
  solidifying said mixture;
  wherein said mixture is deposited on said moving conveyor as an extrudate and said extrudate is cut to form said particles or said mixture is passed though said one or more apertures to form droplets on said moving conveyor and said droplets are solidified to form said particles.

M. The process according to Paragraph L, wherein said anhydrous salt is mixed with said melt composition or a component thereof in a stoichiometrically sufficient amount such that said mixture of said water soluble polymer, said perfume, and said salt hydrate has less than about 15% by weight free water, preferably less than about 5% by weight free water.

N. The process according to Paragraph L or M, wherein said perfume and said water are provided in a slurry comprising said perfume and said water and said perfume is encapsulated perfume.

O. The process according to any of Paragraphs L to N, wherein said anhydrous salt is sodium acetate anhydrous and said sodium acetate anhydrous is provided at a molar ratio of said sodium acetate anhydrous to said water of from about 0.6:3 to about 1.5:3.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A composition comprising a plurality of particles, each of said particles comprising:

A) from about 40% to about 90% by weight of said particles of a water soluble polymer composition, wherein;

i) the water soluble polymer composition comprises a mixture of at least two components;

ii) the first component comprises a first molecular weight and the second component comprises a second molecular weight;

iii) the second molecular weight is different than the first molecular weight, and iv) the first component is a polyethylene glycol and the second component is a polyethylene glycol fatty alcohol ether having a formula of $HO—(C_2H_4O)_s—(CH_2)_t—CH_3$, wherein s is from about 30 to about 250 and t is from about 10 to about 30;

B) about 1% to about 40% by weight of said particles of a salt hydrate; and

C) about 0.1% to about 20% by weight of said particles of perfume; wherein said perfume is dispersed in a matrix of said water soluble polymer and said salt hydrate.

2. The composition according to claim 1, wherein said perfume is encapsulated perfume.

3. The composition according to claim 2, wherein said salt hydrate is selected from the group consisting of calcium chloride tetrahydrate, calcium nitrate tetrahydrate, zinc nitrate trihydrate, zinc nitrate dihydrate, potassium fluoride dihydrate, iron nitrate nonahydrate, sodium dihydrogen phosphate heptahydrate, sodium dihydrogen phosphate dihydrate, sodium acetate trihydrate, sodium aluminum sulfate dodecahydrate, aluminum nitrate nonahydrate, lithium acetate dihydrate, sodium phosphate dodecahydrate, sodium thiosulfate pentahydrate, tetrasodium pyrophosphate decahydrate, barium hydroxide octahydrate, aluminum sulfate octadecahydrate, magnesium carbonate trihydrate, magnesium nitrate hexahydrate, magnesium nitrate dihydrate, magnesium sulfate heptahydrate, magnesium chloride hexahydrate, and combinations thereof.

4. The composition according to claim 1 wherein the polyethylene glycol has a molecular weight of from 2,000 to 15,000.

5. The composition according to claim 4 further comprising a second polyethylene glycol, wherein the first polyethylene glycol has a molecular weight of from about 7,000 to about 15,000, and the second polyethylene glycol has a molecular weight of from about 4,000 to about 6,000.

6. The composition according to claim 3, wherein said particles further comprise from about 0.5% to about 5% by weight acid.

7. The composition according to claim 1, wherein said particles comprise less than about 10% by weight free water.

8. The composition according to claim 1, wherein said particles have an onset of melt from about 40 C to about 55 C.

9. The composition according to claim 1, wherein said salt hydrate is selected from the group consisting of calcium chloride tetrahydrate, calcium nitrate tetrahydrate, zinc nitrate trihydrate, zinc nitrate dihydrate, potassium fluoride dihydrate, iron nitrate nonahydrate, sodium dihydrogen phosphate heptahydrate, sodium dihydrogen phosphate dihydrate, sodium acetate trihydrate, sodium aluminum sulfate dodecahydrate, aluminum nitrate nonahydrate, lithium acetate dihydrate, sodium phosphate dodecahydrate, sodium thiosulfate pentahydrate, tetrasodium pyrophosphate decahydrate, barium hydroxide octahydrate, aluminum sulfate octadecahydrate, magnesium carbonate trihydrate, magnesium nitrate hexahydrate, magnesium nitrate dihydrate, magnesium sulfate heptahydrate, magnesium chloride hexahydrate, and combinations thereof.

10. The composition according to claim 1, wherein said salt hydrate has an onset of melt greater than 40 C.

11. The composition according to claim 1, wherein said perfume is unencapsulated perfume.

12. The composition according to claim 11, wherein said salt hydrate is selected from the group consisting of calcium chloride tetrahydrate, calcium nitrate tetrahydrate, zinc nitrate trihydrate, zinc nitrate dihydrate, potassium fluoride dihydrate, iron nitrate nonahydrate, sodium dihydrogen phosphate heptahydrate, sodium dihydrogen phosphate dihydrate, sodium acetate trihydrate, sodium aluminum sulfate dodecahydrate, aluminum nitrate nonahydrate, lithium acetate dihydrate, sodium phosphate dodecahydrate, sodium thiosulfate pentahydrate, tetrasodium pyrophosphate decahydrate, barium hydroxide octahydrate, aluminum sulfate octadecahydrate, magnesium carbonate trihydrate, magnesium nitrate hexahydrate, magnesium nitrate dihydrate, magnesium sulfate heptahydrate, magnesium chloride hexahydrate, and combinations thereof.

13. A process for forming particles comprising the steps of:

1) providing a melt composition comprising:

A) from about 40% to about 90% by weight of said particles of a water soluble polymer composition, wherein;

i) the water soluble polymer composition comprises a mixture of at least two components;

ii) the first component comprises a first molecular weight and the second component comprises a second molecular weight;

iii) the second molecular weight is different than the first molecular weight, and iv) the first component is a polyethylene glycol and the second component is a polyethylene glycol fatty alcohol ether having a formula of $HO—(C_2H_4O)_s—(CH_2)_t—CH_3$, wherein s is from about 30 to about 250 and t is from about 10 to about 30;

B) about 1% to about 20% by weight of said particles of perfume; and

C) about 1% to about 40% by weight water;

2) mixing an anhydrous salt with said melt composition or a component thereof and hydrating said anhydrous salt to form a salt hydrate, wherein said salt hydrate has an onset of melt;

3) providing a distributor having one or more apertures;

4) passing a mixture comprising said water soluble polymer composition, said perfume, and said salt hydrate through said one or more apertures and depositing said mixture on a moving conveyor beneath said one or more apertures, wherein said mixture has a temperature less than said salt hydrate onset of melt; and solidifying said mixture; wherein said mixture is deposited on said moving conveyor as an extrudate and said extrudate is cut to form said particles or said mixture is passed though said one or more apertures to form droplets on said moving conveyor and said droplets are solidified to form said particles.

14. The process of claim 13, wherein said anhydrous salt is mixed with said melt composition or a component thereof in a stoichiometrically sufficient amount such that said mixture of said water soluble polymer composition, said perfume, and said salt hydrate has less than about 5% by weight free water.

15. The process according to claim 13, wherein said perfume and said water are provided in a slurry comprising said perfume and said water and said perfume is encapsulated perfume.

16. The process according to claim 13, wherein said anhydrous salt is sodium acetate anhydrous and said sodium acetate anhydrous is provided at a molar ratio of said sodium acetate anhydrous to said water of from about 0.6:3 to about 1.5:3.

17. The process according to claim 13, wherein said anhydrous salt is sodium acetate anhydrous.

18. The composition according to claim 5 wherein both the first and second polyethylene glycol have a molecular weight of from about 2,000 to about 15,000.

19. The composition according to claim 18 wherein the first polyethylene glycol has a molecular weight of from about 7,000 to about 11,000, and the second polyethylene glycol has a molecular weight of from about 4,000 to about 6,000.

* * * * *